United States Patent [19]

Francis et al.

[11] Patent Number: 4,682,517

[45] Date of Patent: Jul. 28, 1987

[54] VARIABLE SPEED DRIVE—APPARATUS AND METHOD OF FABRICATING THE APPARATUS

[75] Inventors: John H. Francis, Charlestown, W. Va.; Roy E. Van DerLinden, Frederick, Md.

[73] Assignee: Frederick Manufacturing Company, Inc., Frederick, Md.

[21] Appl. No.: 691,863

[22] Filed: Jan. 16, 1985

[51] Int. Cl.[4] ...................... F16H 15/50; F16H 15/16
[52] U.S. Cl. ...................................... 74/796; 74/800; 74/191; 74/208
[58] Field of Search ................. 74/191, 190, 192, 193, 74/796, 800

[56] References Cited

U.S. PATENT DOCUMENTS

| | | | |
|---|---|---|---|
| 1,223,966 | 4/1917 | Gutt | 74/191 |
| 1,382,244 | 6/1921 | Roudil et al. | 74/191 |
| 2,079,681 | 5/1937 | Chilton | 74/191 |
| 2,721,483 | 10/1955 | Halker | 74/191 |
| 3,085,450 | 4/1963 | Graham et al. | 74/796 |
| 3,158,041 | 11/1964 | Rae | 74/191 |
| 3,227,004 | 1/1966 | Orain | 74/796 |
| 3,442,158 | 5/1969 | Marcus | 74/796 |
| 3,530,742 | 9/1970 | Sfredda | 74/191 |
| 3,630,095 | 12/1971 | Eakin | 74/796 |
| 3,661,036 | 5/1972 | Quiram et al. | 74/796 |
| 3,910,137 | 10/1975 | Nedeljkovitch | 74/191 |
| 4,293,050 | 10/1981 | Goloff et al. | 74/191 |
| 4,515,028 | 5/1985 | VanDerLinden et al. | 74/191 |
| 4,599,910 | 7/1986 | Francis | 74/206 |

FOREIGN PATENT DOCUMENTS

| | | | |
|---|---|---|---|
| 814369 | 9/1951 | Fed. Rep. of Germany | 74/796 |
| 473349 | 9/1914 | France | 74/208 |
| 1003009 | 11/1946 | France | 74/191 |
| 1141243 | 4/1957 | France | 74/796 |
| 447259 | 4/1949 | Italy | 74/191 |
| 554545 | 1/1957 | Italy | 74/191 |
| 58295 | 8/1946 | Netherlands | 74/191 |
| 556298 | 9/1943 | United Kingdom | 74/800 |

OTHER PUBLICATIONS

*Mechanisms, Linkages & Mechanical Controls,* "10 Universal Shaft-Couplings", pp. 326–327, 1965.

*Primary Examiner*—Lawrence Staab
*Attorney, Agent, or Firm*—Millen & White

[57] ABSTRACT

A variable speed drive varies the speed ratio between an input shaft and an output shaft. The input shaft is coupled to the output shaft through a cone which is connected to the input shaft by a rigid link and to the output shaft by a constant velocity joint. The cone rolls on a curvilinear surface to transmit motion from the input shaft to the output shaft. In order to vary the speed ratio, the position of the cone on the curvilinear surface is changed.

8 Claims, 6 Drawing Figures

VARIABLE SPEED DRIVE—APPARATUS AND METHOD OF FABRICATING THE APPARATUS

RELATED PATENTS AND PATENT APPLICATIONS

U.S. patent application Ser. No. 426,874, filed Sept. 29, 1982 now U.S. Pat. No. 4,459,840 issued July 17, 1984.

U.S. patent application Ser. No. 426,875 filed Sept. 29, 1982 now U.S. Pat. No. 4,599,910 issued July 15, 1986.

U.S. patent application Ser. No. 480,144 filed Mar. 29, 1983 now U.S. Pat. No. 4,515,028 issued May 7, 1985.

BACKGROUND OF THE INVENTION (1) Field of the Invention

The instant invention relates to variable speed drives. More particularly, the instant invention relates to variable speed drives utilizing conical rolling surfaces.

(2) Technical Considerations and Prior Art

Applicant's prior applications, U.S. patent application Ser. Nos. 426,875 and 480,144 now U.S. Pat. No. 4,459,840 respectively disclose the concept of utilizing a non-slipping, conical transmission member in a single-speed drive and a multi-speed drive, respectively. The drives disclosed in these patent applications have numerous advantages over conventional gear drives and other types of transmissions such as conventional traction drives and drives which rely on belts and cones. However, for certain applications, such as automatic transmissions used with piston driven engines, there is a pressing need for variable speed transmissions in which the output speed of the transmission can be varied continuously with respect to the input speed, rather than being varied in a step-wise manner, such as is disclosed in U.S. patent application Ser. No. 480,144 now U.S. Pat. No. 4,515,028.

Perhaps the closest family of prior art devices are traction drives which have been discussed in detail in the book *Traction Drives, Selection and Application*, by F. W. Leilich III and E. E. Shube; Marcel Dekker, Incorporated; 1983. All of the traction drives disclosed in this book utilize a "traction fluid" to transmit forces from input members to output members. The traction fluid is necessary because the members slip relative to one another and must therefore be lubricated with a fluid to minimize heat and to minimize wear of opposed surfaces. Since the lubricating fluid must also transmit tangential drive forces between the members, the fluid must have a very high viscosity pressure index. Appropriate lubricating fluids have only recently become available, however, these lubricants, like any lubricants, are subject to degredation and failure. Moreover, these traction drives must provide auxillary structure and devices for handling lubricating fluids resulting in additional design complications, increased weight, reliability problems, maintance concerns, and expense. In addition, since these traction devices "slip", they have an inherent inefficiency which is undesirable in and of itself, and which generates heat that must in some manner be compensated for or disposed of.

Another approach, which of late appears to show commercial promise as a variable speed drive, is a belt driven arrangement wherein a wear-resistant, fabric or metal belt is nested between pairs of pulleys having conical surfaces which are capable of moving toward and away from one another. This movement varies the diameter at the driven or driving pulley pairs and thus changes the speed of a driven shaft with respect to a driving shaft. While no lubrication is used between the opposed surfaces of the belt and pulleys (negating the aforementioned difficulties caused by lubrication), belt drives have other problems. Since the belts necessarily slide on the pulley surfaces as speed is varied in these drives, there is wear which eventually degrades the belts necessitating their replacement. Moreover, the belts are continually worked as they flex in their passage around the pulleys. This consumes power and generates heat, which heat further degrades the belt. The slippage, flexing and heat introduce inefficiencies in belt drives, thus reducing their desirability.

In view of the aforementioned drawbacks of prior art devices, there is a pressing need for improvement in such devices.

SUMMARY OF THE INVENTION

Apparatus for varying the speed ratio of an output shaft relative to the input shaft in accordance with the principals of the instant invention contemplates aligning the input shaft with the output shaft along a first axis and connecting the shafts by first and second members. The first member has a concial surface diverging from an apex, whereas the second member has a curvilinear surface. One of the members is aligned with the first axis while the other member is coupled to the input and output shafts. The members are held in contact with one another at a selected location while the apex of the conical surface is held in coincidence with the first axis. In order to vary the speed ratio, the position of the point at which the conical and curvilinear surfaces engage is moved to a different location. While at the different location, the apex of the conical surface is still maintained in coincidence with the first axis.

In accordance with a preferred embodiment of the invention, the first member is coupled directly between the input shaft and output shaft and rolls on the second member which is held substantially stationery. Changes in the speed ratio are accomplished by moving the output shaft in the direction of the first axis.

The instant invention further contemplates the method of utilizing the aforedescribed apparatus and a method of generating the curvilinear surface.

The method for generating the curvilinear surface comprises selecting a particular range of ratios, and thereafter, creating a curve which serves as the generatrix of the curvilinear surface by restraining a right cone with a rigid link, which link is pivoted to the base of the cone and at the first axis. The apex of the cone is thereafter moved along the first axis while the base of the cone is restrained by the link. The curve formed by the point to which the surface of the cone is always tangent becomes the generatrix of the curvilinear surface.

The curvilinear surface is thereafter precisely formed by utilizing a grinding wheel having the same shape as the cone. The grinding wheel is rotated about the axis of the cone while being revolved about the first axis. As the grinding wheel is revolved and rotated, the apex of the grinding wheel remains coincident with the first axis as the apex is moved along the first axis.

DESCRIPTION OF THE PREFERRED EMBODIMENT

Figures 1, 2:
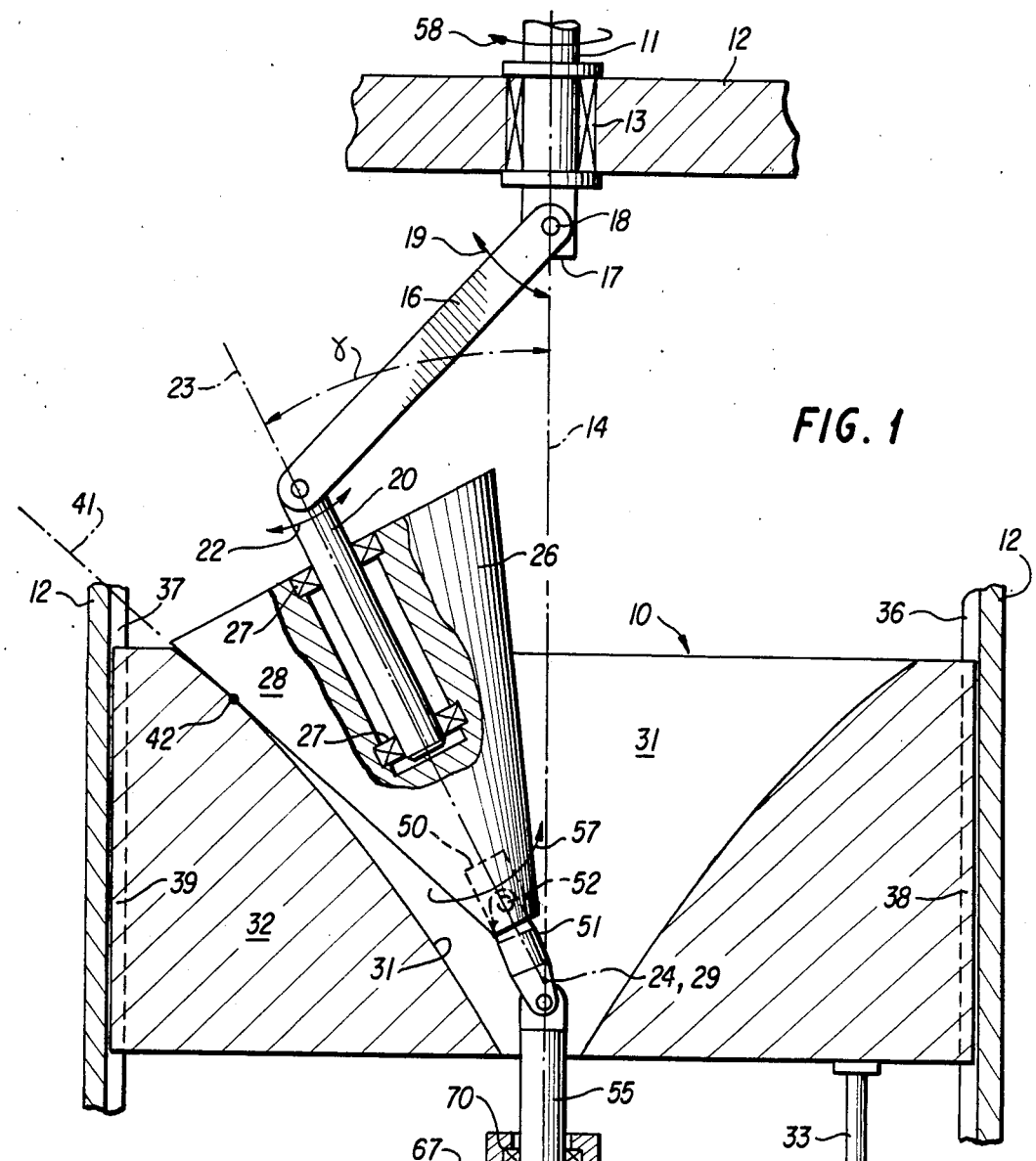
FIG. 1 is a side view, partially in section and with some parts broken away, showing a variable speed drive which utilizes a cone in accordance with the principals of the instant invention.
FIG. 2 sectional view taken along lines 2—2 of FIG. 1.

Referring now to FIG. 1, there is shown a variable speed drive, designated by the numeral 10, configured in accordance with the principles of the instant invention. The variable speed drive 10 has an output speed which is variable with respect to its input speed. For all practical purposes the output speed is variable in infinitely small steps. Consequently, the output of the variable speed drive can precisely provide an ideal output speed for a particular input speed. This characteristic of the variable speed drive 10 is of great significance with respect to the automotive industry wherein piston powered gasoline and diesel engines operate most efficiently at selected speeds.

The variable speed drive 10 has an input shaft 11 journalled for rotation in a fixed member 12 by bearing 13. The fixed member 12 may be a portion of a housing for the drive 10. The shaft 11 is free to rotate about a first axis 14 but is restrained from axial movement with respect to the first axis. The first axis 14 forms a central axis of the variable speed drive 10 with respect to which central axis other components of the variable speed drive either rotate or revolve. In accordance with one embodiment of the invention, the input shaft 11 is coupled to a prime mover such as a piston engine, or the like (not shown).

A rigid link 16 is pivoted to the input shaft 11 adjacent the free end 17 thereof by a pin 18. As is exemplified by arrow 19, the link 16 is free to pivot with respect to the input shaft 11 in both directions as the shaft 11 rotates to provide an articulated coupling that moves the second end of the cone 26.

A cone mounting shaft 20 is pivoted to the link 16 at the end thereof by a pin 21 so as to be free to pivot about the pin 21 in the directions exemplified by arrow 22. The cone mounting shaft 19 is alligned with a second axis 23 which intersects the first axis 14 at a point 24. As will be explained hereinafter, the point 24 moves on the axis 14 in order to vary the output speed of the variable drive 10 with respect to the input speed.

Mounted for rotation on the shaft 20 is a cone 26 which is journalled thereto for rotation with respect thereon by bearings 27. The cone 26 is a right cone and has a conical surface 28 thereon diverging from a first end at an imaginary apex 29. The conical surface 28 engages an empirically generated, concave, curvilinear surface 31 which serves as a track around which the cone rolls. In the embodiment of FIG. 1, the curvilinear surface 31 is generated by rotating a portion of a parabola or hyperbola The curvilinear surface 31 is formed in an annular plate or platen 32 which is urged against the conical surface 28 of the cone 26 by the piston rod 33 of a hydraulic cylinder 34. In order to permit the cylinder 34 to apply pressure to the platen 32, the platen 32 is mounted between a pair of guide rails 36 and 37 mounted on the fixed member or housing 12 which are received in grooves 38 and 39 in the peripheral of the platen. The platen 32 has very limited movement with respect to the housing 12 and it moves just sufficiently to allow the hydraulic cylinder 34 to force the surface 31 against the conical surface 28 of the cone 26.

Since the cone 26 is a right cone, the conical surface 28 forms a tangent, illustrated by dotted line 41, to the curvilinear surface 31 at any point 42 that the conical surface engages the curvilinear surface 31. Moreover, the tangent 41 always intersects the apex 29 of the cone 26 at the point of the first axis 26. In accordance with the instant invention, the apex 29 of the cone is always coincident with the first axis 14 at point 24 thereon, and is necessarily always coincident with the second axis 23 at the same point.

The cone 26 has a shaft 50 received therein and fixed with respect thereto, wwhich shaft serves as an anchor for one end of a cardin constant velocity joint 51. The constant velocity joint 51 is pivoted to the shaft 50 by a pin 52. The other end of the constant velocity joint 51 is pivoted by pin 53 to a shaft portion 55 which forms a portion of a output shaft assembly, designated generally by the numeral 56.

As the cone 26 is driven to rotate in direction 57 by rotation of the input shaft 11 in direction 58, the shaft 55 also rotates in the direction 57 which is opposite to the direction 58 in which the input shaft 11 rotates. The shaft portion 55 is in axial alignment with the first axis 14 and is reciprocal in the direction of the first axis 14 by the action of a second hydraulic cylinder 59. As the shaft portion 55 reciprocates, the point 42 at which tangent 41 engages the curvilinear surface 31 is moved. As will be further explained hereinafter, as the point 42 changes position on the surface 31 the ratio of the output speed to the input speed of the variable speed drive 10 changes.

In order to facilitate reciprocation of the shaft portion 55, the shaft portion 55 is received in a bore 60 of an output shaft portion 61 which is a portion of the output shaft assembly 56. As is seen in FIG. 2, the shaft portion 55 has keys 62 therein which are received in key slots 63 of the output shaft portion 61 so that the output shaft portion 61 will rotate with the shaft portion 55. The output shaft portion 61 is mounted for rotation only with respect to a fixed member 12, which fixed member may be the housing which encloses the entire variable speed drive 10. In order to reciprocate the shaft portion 55, a collar 65 is positioned around the shaft 55 and is connected to a piston rod 66 of the hydraulic cylinder 59 by ring 67 rigidly attached to the collar and piston rod. Thrust bearings 70 are positioned within the collar 65 so as to allow the shaft 55 to rotate freely within the collar 65 while being moved in the direction of first axis 14.

In order to effect the principles of the instant invention, it is necessary that as the shaft 55 is reciprocated, the apex 29 of cone 26 always remains coincident with axis 14. As long as there is this coincidence, the conical surface 28 on cone 26 will not slip with respect to the curvilinear surface 31. So long as there is no slippage, neither lubrication nor traction fluid is necessary between the surfaces 28 and 31. The variable speed drive 10 will deliver torque very efficiently from the input shaft 11 to the output shaft assembly 56 with a minimal number of either stationary or moving parts.

Figure 3:
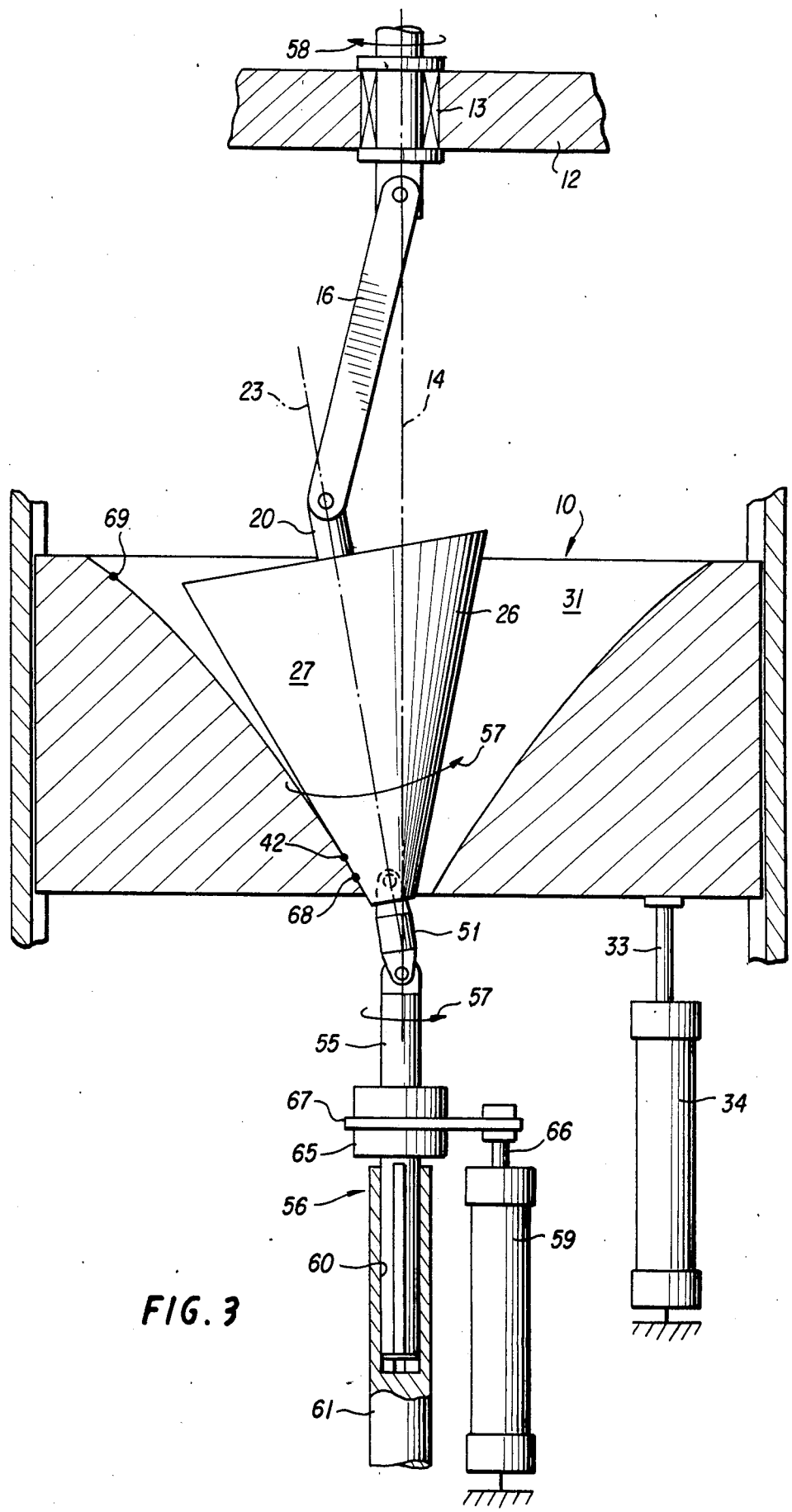
FIG. 3 is a side view, partially in section, illustrating the variable speed drive shown of FIG. 1 with its cone in a position.
Figure 4:
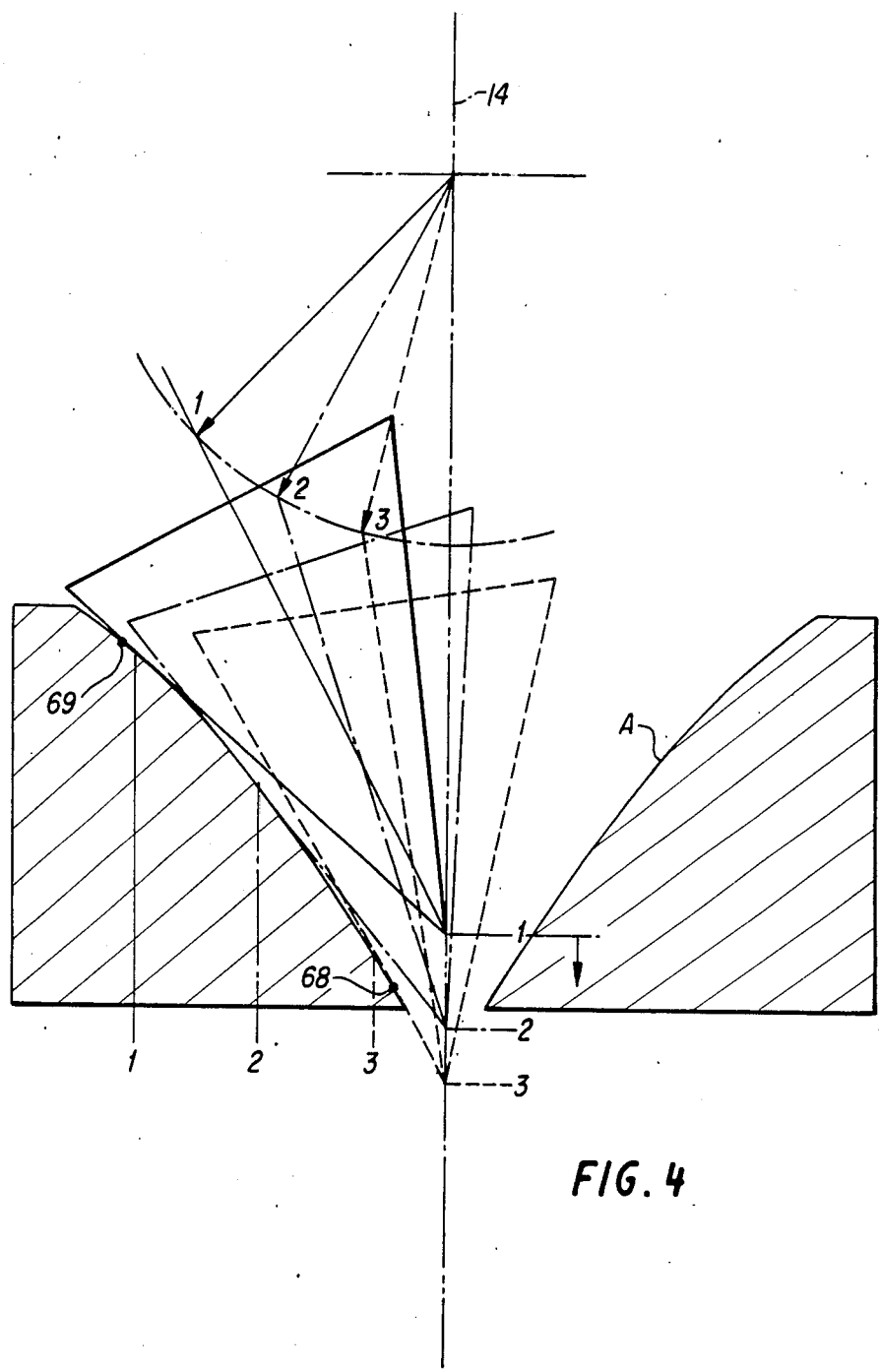
FIG. 4 is a diagramatical view showing the cone in three positions with respect to the surface upon which it rolls.

Referring now to FIGS. 3 and 4, wherein the cone 26 is shown in both a solid line position and dotted line positions, it is seen that in each position, the apex 29 of the cone remains coincident with the first axis 14. When the angle γ between the first and second axes 14 and 23 is relatively large, the output shaft assembly 56, 61 rotates at a faster speed with respect to the input shaft 11 than when the angle γ is relatively small. As with conventional multi-speed or variable speed drives, the torque delivered by the output shaft 61 is higher with respect to torque on input shaft 11 when the cone 26 is rotating relatively slow with respect to the input shaft than it is when the cone is rotating relatively fast with respect to the input shaft. As the angle γ approaches zero, the speed at which the cone rotates approaches zero. In accordance with the principles of the instant invention, the cone 26 may assume a very large number of separate positions with respect to the curvilinear surface 31 in that the cone 26 does not move step-wise from one position to another as the drive changes speed. Rather, the cone 26 progresses smoothly over the curvilinear surface 31 as it is rocked thereon to move the point of tangency 42 to selected positions between end points 68 and 69 on the curvilinear surface.

The variable speed drive 10 thus far described is inherently torque limiting in that the conical surface 28 will slip on the curvilinear surface 31 if the torque required of the input shaft 11 to rotate the output shaft assembly 56 exceeds a predetermined level. This level is readily determined by the amount of force with which hydraulic cylinder 34 urges platen 32 against cone 26.

Figure 5:
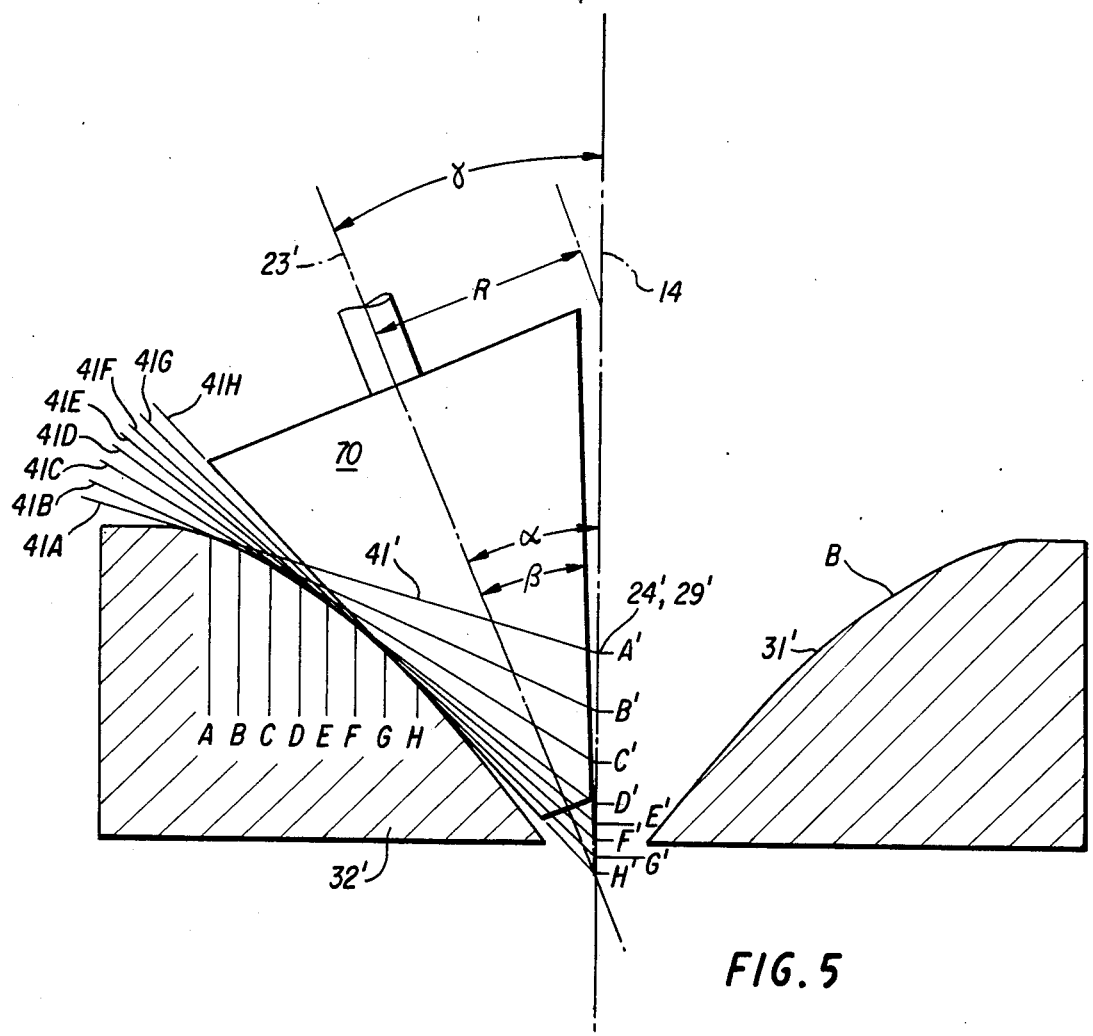
FIG. 5 is a diagramatical view, partially in section, showing how the curvilinear surface upon which the cone rolls is by a grinding wheel having a geometry similar cone.

In comparing FIGS. 1, 3 and 4 with FIG. 5, it is seen that the curvilinear surface 31 may have various shapes and that the shape of the curve is a function of the conical angle 2 β. In FIGS. 1, 3 and 4, the generatrix 71 of the curvilinear surface 31 has a relatively high slope because the angle 2 β is relatively small. In FIG. 5, the generatrix 72 of the curvilinear surface 31 has a relatively low slope because the angle 2 is relatively large. However, in each case when the distance between contact points A, B, C, etc. on the generatrices 71 and 72 are equal, the corresponding points A', B', C' etc. of the coincidence of the apex 29 with the first axis 14 are spaced logarithmically.

In accordnace with one method for determining the shape of the curvilinear surface 31, the dimensions of the right cone 26 are first determined. Thereafter, the cone 26 is moved upwardly while being restrained by link 16 and while maintaining the apex 29 of the cone in coincidence with the first axis 14. The curve which forms the generatrix for the curvilinear surface 31 is the curve to which the line 41 is tangent at any position of the cone.

Referring now to FIG. 5, there is shown a grinding wheel 75 which has a geometry substantially identical to the cone 26 shown in FIGS. 1, 3 and 4. The grinding wheel 75 is rotated about the second axis 23' while keeping the apex 29' of the grinding wheel coincident with the first axis 14'. The grinding wheel is then brought into contact with a blank from which the platen 32' is fabricated in order to generate the curvilinear surface 31'. The particular shape of the surface 31' is determined by keeping the apex 29' of the grinding wheel 75 on the first axis 14 while pressing the grinding wheel into engagement with a surface 31' which is subsequently ground down to the desired curvilinear shape. The tangent line 41A–41H intersects surface 31' at points A–H thereon which represent different locations of the tangental point 42. The tangent line 41 intersects the first axis 14 at points A–H, wherein each of the points A–H correspond to a location on the surface 31. The points A–H on the first axis 14 also represent the point of coincidence of the apex 29' of the grinding wheel 75 and the intersection point 24' of the second axis 23' with the first axis 14'.

Figure 6:
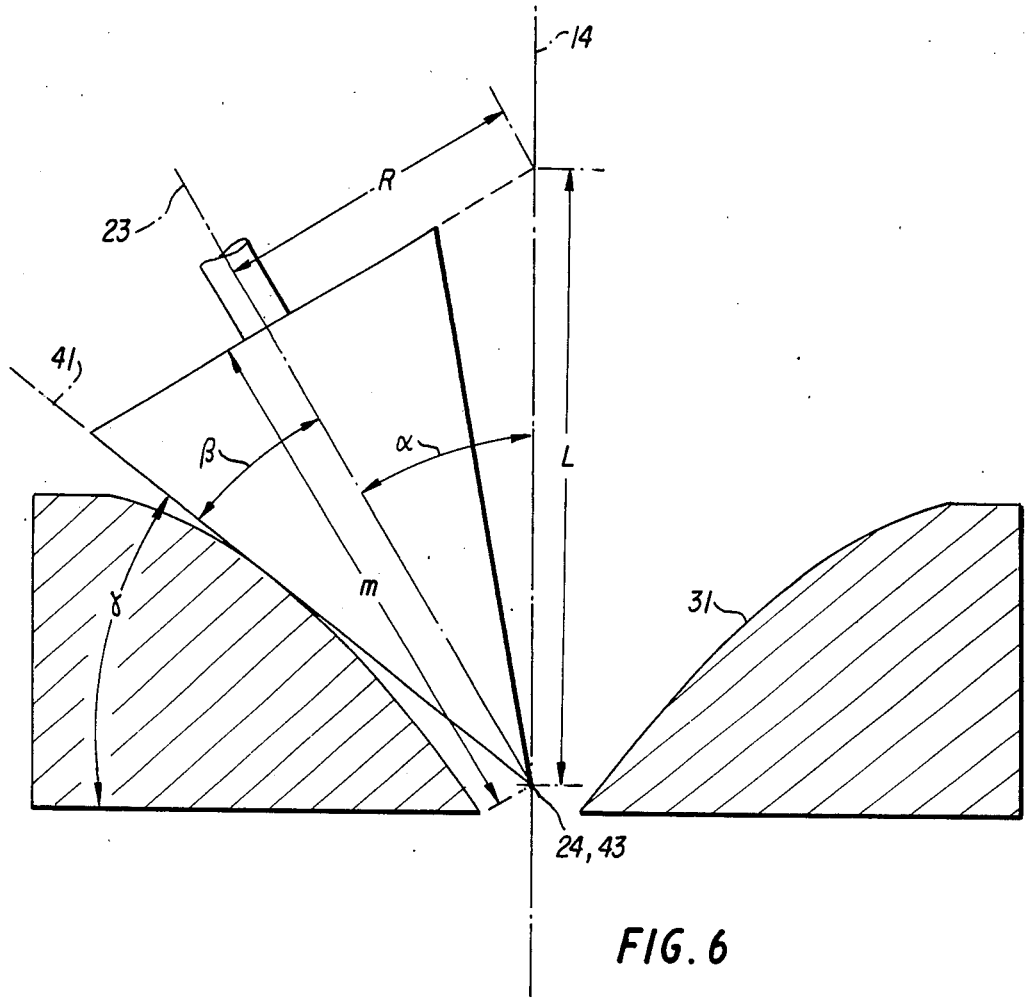
FIG. 6 is a schematic view utilized in demonstrating a mathematical justification of the instant invention.

Referring now to FIG. 6, there is shown a schematic illustration of the instant invention showing the cone 26 in its geometric relationship with the surface 31 wherein the following symbols are indicative of the following dimensions:

σ—angle between first axis 14 and second axis 23;
α—angle between tangent line 41 and X axis
β—angle between second axis 23 and tangent line 41.

The Ratio: of the input speed to the output speed is as follows:

$$R = \frac{\sin\beta}{\sin(\beta + \sigma) - \sin}.$$

From multi-speed reducer $$R = \frac{\cos(\alpha + \sigma)}{\cos\alpha - \cos(\alpha + \sigma)},$$

but $$\alpha = 90° - \beta - \sigma$$

since $$\cos(90 - \beta - \sigma) = \sin(\beta + \sigma)$$

$$R = \frac{\sin\beta}{\sin(\beta + \sigma) - \sin\beta}.$$

The aforediscussed embodiments of the invention are merely illustrative of the invention which is limited only by the following claims:

What is claimed is:

1. Apparatus for varying in substantially infinitely small increments the speed ratio of an output shaft relative an input shaft as long as the torque transmitted from one shaft to another remains below a selected torque; the apparatus comprising:

means for axially aligning the output shaft and the input shaft with a first axis;
a track member extending laterally of the first axis and having a curvilinear surface converging toward the first axis;
a conical member rotating about an axel coincident to a second axis and having a conical surface diverging from a first end of the conical member adjacent the apex thereof toward a second end of the conical member, the conical surface engaging the curvilinear surface of the track member;
linkage means for connecting the axel of the conical member adjacent the second end of the conical member to the input shaft while holding the conical surface in engagement with the curvilinear surface the linkage means including a bearing member journaled with the cone and a link piveted to both the bearing member and input shaft, wherein the conical member rolls on the curvilinear surface about the second axis as the input shaft rotates;

means for connecting the conical member to the output shaft adjacent the first end of the conical member, wherein the output shaft rotates as the conical menber rolls;

means for moving the second end of the conical member laterally with respect to the track member while moving the entire conical member axially, whereby the conical surface engages the curvilinear surface of the track member at various locations thereon and the ratio of the output speed with respect ot the input speed is changed;

means for maintaining the apex of the cone in coincidence with the first axis while the cone rolls on the curvilinear surface wherein the cone does not slip with respect to the first surface as the cone transmits rotation from the input shaft to the output shaft as long as the torque is less than the selected torque.

2. The apparatus of claim 1, wherein the link is a rigid link.

3. The apparatus of claim 2 wherein the means for connecting the cone to the output shaft is a constant velocity joint.

4. The apparatus of claim 1 wherein the means for connecting the cone to the output shaft is a constant velocity joint.

5. The apparatus of claim 1 wherein the output shaft means includes a shaft portion moveable in the axial direction of the first axis and wherein the means for moving the conical member with respect to the track member includes shaft reciprocating means for both moving the shaft portion in the axial direction in order to shift the conical surface on the curvilinear surface and for restraining the shaft portion in a selected position.

6. The apparatus of claim 5 wherein the means for moving the shaft portion includes hydraulic cylinder means connected to the shaft portion for moving the shaft portion.

7. The apparatus of claim 6 further including means for urging the track member toward the conical member as the conical member is restrained by the shaft reciprocating means.

8. The apparatus of claim 7 wherein the means for urging the track member toward the conical member is a hydraulic cylinder having a piston rod connected to the track member.

* * * * *